United States Patent [19]

Killam

[11] 4,017,440

[45] Apr. 12, 1977

[54] POLYMERS STABILIZED WITH POLYMERIZABLE VINYLBENZYLTRIALKYL AMMONIUM SALT SURFACTANT

[75] Inventor: H. Scott Killam, Holland, Pa.

[73] Assignee: Rohm and Haas Company, Philadelphia, Pa.

[22] Filed: Oct. 10, 1973

[21] Appl. No.: 405,221

[52] U.S. Cl. .................. 260/29.6 HN; 162/168 N; 260/67 UA; 260/79.7; 526/310; 526/291
[51] Int. Cl.$^2$ ............... C08F 212/08; C08F 226/00
[58] Field of Search ............ 260/29.6 HN, 89.5 N, 260/80.3 N, 89.7 N, 80.73, 80.75, 67 UA, 79.7; 117/161 UA, DIG. 4

[56] References Cited

UNITED STATES PATENTS

| | | | |
|---|---|---|---|
| 2,009,015 | 7/1935 | Powers et al. | 117/DIG. 4 |
| 2,595,225 | 5/1952 | Coffman | 117/DIG. 4 |
| 2,656,339 | 10/1953 | Padbury | 43/22 |
| 2,744,130 | 5/1956 | Winberg | 260/29.6 HN |
| 2,884,057 | 4/1959 | Watson et al. | 260/89.7 N |
| 2,941,969 | 6/1960 | Price | 260/29.6 HN |
| 3,068,213 | 12/1962 | Rossiveiler | 260/29.6 HN |
| 3,248,352 | 4/1966 | Marascia | 260/89.5 N |
| 3,702,799 | 11/1972 | Lewis | 117/155 UA |
| 3,780,092 | 12/1973 | Samour | 260/29.6 HN |
| 3,925,442 | 12/1975 | Samour | 526/310 |

OTHER PUBLICATIONS

"Papermaking and Paperboard Making's, pp. Macdonald, Editor-McGraw-Hill, 2nd Ed., vol. III.
D. C. Blackley–"High Polymer Latices"–vol. 1, pp. 6 & 7, Applied Science Publisher, Ltd.–London 1966.
K. Britt–Handbook of Pulp & Paper Technology–2nd Edition–1970–Don Nostrand–Reinhold–pp. 355, 356, 365.

*Primary Examiner*—Joseph L. Schofer
*Assistant Examiner*—Peter F. Kulkosky

[57] ABSTRACT

An effective amount of a vinylbenzyltrialkylammonium salt, prepared from a vinylbenzyl halide and a tertiary amine, is polymerized with various other monomers to afford stable latex polymers which have the latex stabilizing surfactant incorporated into the polymer backbone. The use of a vinylbenzyltrialkylammonium salt lessens or avoids the usual problems associated with the conventional anionic, nonionic or cationic emulsifiers employed in aqueous polymerizations; that is, the latex stabilizing surfactant incorporated into the polymer backbone is the sole emulsifier employed. The copolymers prepared with the quaternary ammonium compounds are useful as sizing agents, as extender/binders for cationic water repellents; in addition, the polymers are depositable on pulp without requiring any deposition aids or defoamers.

6 Claims, No Drawings

POLYMERS STABILIZED WITH POLYMERIZABLE VINYLBENZYLTRIALKYL AMMONIUM SALT SURFACTANT

This invention relates to novel compositions containing vinylbenzyltrialkylammonium salts and also to the use of the vinylbenzyltrialkylammonium halides to make a wide variety of latex polymers wherein the copolymerized vinylbenzyltrialkylammonium salt func- incorporated directly into the polymer backbone, as the sole latex stabilizing surfactant.
sole latex stabilizing surfactant.

The latex polymers which are prepared with the vinylbenzyltrialkylammonium halides (I, infra) overcome the problems associated with conventional anionic, nonionic and cationic emulsifiers. These problems are generally excessive foaming, water sensitivity, plasticization and migration.

In addition to the general utility of the latex polymers of this invention, there are three specific areas where these latex polymers are useful:

1. As a sizing agent to increase the stiffness, water resistance, strength, smoothness or weight of various materials such as paper, fabric and the like. Laboratory results indicate the the instant compounds compare favorably with rosin.

2. To eliminate the use of a beater deposition aid. The chief problems in beater deposition with latices made using conventional surfactants are foam and water contamination. In addition, deposition aids are required during deposition. The foams can actually interfere with the deposition process and can require the use of auxiliary defoamers and other additives. The surfactant and defoamer can then end up in the waste water with resulting pollution problems. The polymers of this invention are deposited on the pulp without requiring external deposition aids or defoamers, thus simplifying the entire operation and overcoming ecological problems of water contamination.

3. Another area of utility is as an extender-binder for fluorocarbon water repellents. The normal procedure to render a non-woven substrate resistant to water and alcohol, for example, disposable hospital surgical gowns, is to first treat the substrate with a latex binder containing a conventional surfactant. The substrate is then treated with the required level of cationic water repellent. A two-step process is required because the latex, if made with an anionic surfactant, is incompatible with the repellent. When synthesized using a nonionic surfactant, the necessary high level or repellency is difficult to achieve. An explanation for the latter observation is related to the ability of the surfactant to migrate. When the surfactant is tied up in the polymer backbone and when it is cationic in charge, non-migration and compatibility are realized.

The vinylbenzyltrialkylammonium salt employed in this invention (I, infra) has the following structural formula:

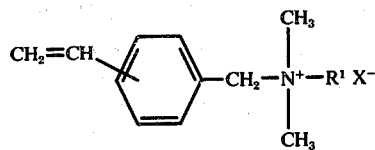

I wherein $R^1$ is an alkyl radical, for example, a straight or branched chain alkyl radical, containing from about 8 to about 22 carbon atoms and, preferably, containing from about 12 to about 18 carbon atoms such as octyl, nonyl, decyl, undecyl, dodecyl, tridecyl, tetradecyl, pentadecyl, hexadecyl, heptadecyl, nonodecyl, eicosyl, henecosyl, docosyl and the like. $X^-$ is an anion, for example, a halide such as bromide, chloride and the like, hydroxide, sulfate, nitrate, acetate, oxalate and the like. The preferred anion is chloride.

For the latex polymers of this invention to have the utility mentioned, it is necessary to employ an effective amount of the vinylbenzyltrialkylammonium salt (I, supra). An effective amount of the monomer has been found to be in the range of from about 0.25 to about 5 percent of the total polymer composition with the preferred range being from about 0.5 to 2.5 percent of the total polymer composition. The desired latices are prepared by copolymerizing an effective amount of the vinylbenzyltrialkylammonium halide monomer with one or more monomers selected from the following:

a. a monomer of the formula

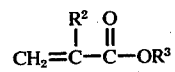

wherein $R^2$ is hydrogen or alkyl, for example, lower alkyl of from 1–4 carbon atoms and $R^3$ is a straight chain, branched chain or cyclic alkyl, alkoxyalkyl or alkylthioalkyl radical wherein the alkyl contains from about 1 to about 20 carbon atoms, and the cycloalkyl radical contains from 5–6 nuclear carbon atoms. Examples of these radicals include methyl, ethyl, propyl, n-butyl, 2-ethylhexyl, heptyl, hexyl, octyl, 2-methylbutyl, 1-methylbutyl, butoxybutyl, 2-methylpentyl, methoxymethyl, ethoxyethyl, cyclopentyl, cyclohexyl, isobutyl, ethylthioethyl, methylthioethyl, ethylthiopropyl, 6-methylnonyl, decyl, dodecyl, tetradecyl, pentadecyl and the like. $R^3$ is also ureido, hydroxy lower alkyl of from 1 to 5 carbon atoms such as hydroxymethyl, hydroxyethyl, hydroxypropyl, hydroxybutyl, hydroxypentyl, and the like; 2,3-epoxypropyl, amino lower alkyl such as aminomethyl, aminoethyl and the like, mono- or di- lower alkylamino lower alkyl such as tertbutylaminoethyl, dimethylaminoethyl and the like.

b. a monomer of the formula

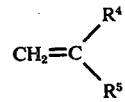

wherein $R^4$ is hydrogen, methyl or halo such as chloro and the like and $R^5$ is hydrogen, halo such as chloro and the like; lower alkanoyloxy such as acetoxy and the like, cyano, formyl, phenyl, carbamoyl, N-hydroxymethyl, tolyl, methoxyethyl, 2,4-diamino-s-triazinyl lower alkyl or epoxy.

Examples of the specific monomers described in subparagraphs (a) and (b) include: ethylene, methyl methacrylate, ethyl methacrylate, propyl methacrylate, isopropyl methacrylate, n-butyl methacrylate, isobutyl methacrylate, sec-butyl methacrylate, tert-butyl methacrylate, pentyl methacrylate, isopentyl methacrylate, tert-pentyl methacrylate, hexyl methacrylate, cyclohexyl methacrylate, 2-ethylbutyl methacrylate, 2-ethylhexyl methacrylate, octyl methacrylate, decyl methacrylate, lauryl methacrylate, myristyl methacrylate, cetyl methacrylate, stearyl methacryl methyl acrylate, ethyl acrylate, propyl acrylate, isopropyl acrylate, butyl acrylate, isobutyl acrylate, sec-butyl acrylate, tert-butyl acrylate, pentyl acrylate, isopentyl acrylate, tert-pentyl acrylate, hexyl acrylate, octyl acrylate, 2-ethylhexyl acrylate, vinyl acetate, tetradecyl acrylate, acrylamide, pentadecyl acrylate, styrene, pentadecyl methacrylate, vinyltoluene, methacrylamide, N-methylolacrylamide and the like, glycidyl methacrylate, methylaminoethyl methacrylate, tert-butylaminoethyl methacrylate, dimethylaminoethyl methacrylate, 6-(3-butenyl)-2,4-diamino-s-triazine, hydroxypropyl methacrylate, hydroxyethyl methacrylate, acrylonitrile, methacrylonitrile, methoxymethyl methacrylamide, N-methylol methacrylamide, acrolein, methacrolein, 3,4-epoxy-1-butene and the like.

Water-sensitive materials such as isocyanates should not be used in aqueous systems unless they are blocked by reaction with a phenol which protects the isocyanate until subsequent heating or until the use of other reaction mechanisms such as the use of calcium, zinc, or tin compound catalyst conventional in the art.

The halide anions are the ones generally employed, other anions can be employed to afford similar results. These other anions include hydroxide, sulfate, nitrate, acetate, formate, oxalate and the like. These anions may be introduced into the monomer by ion exchange techniques well known to those skilled in the art.

The preferred emulsion copolymers have a molecular weight of between about 70,000 and 2,000,000 and preferably between about 250,000 and 1,000,000 and are made by the emulsion copolymerization of the several monomers in the proper proportions. Conventional emulsion polymerization techniques are described in U.S. Pat. Nos. 2,754,280 and 2,795,654. A polymerization initiator of the freeradical type, such as ammonium or potassium persulfate, may be used alone or in conjunction with an accelerator, such as potassium metabisulfite, or sodium thiosulfate. Organic peroxides, such as benzoyl peroxide and tert-butyl hydroperoxide are also useful initiators. The initiator and accelerator, commonly referred to as catalyst, may be used in proportions of 0.1 percent to 10 percent each based on the weight of monomers to be copolymerized. The amount, as indicated above, may be adjusted to control the intrinsic viscosity of the polymer. The temperature may be from room temperature to about 200° F.

The vinylbenzyltrialkylammonium halides (I, supra) are known compounds and are prepared by methods well known to those skilled in the art, for example, by reacting an alkyldimethylamine with a vinylbenzyl halide.

The following examples illustrate the products of this invention and the methods for their preparation. However, the invention should not be construed to be limited by these examples for the examples illustrate how to prepare any copolymer with a latex stabilizing surfactant incorporated into the backbone of the polymer.

EXAMPLE 1

Latex of Butyl acrylate (60%), Styrene (37.5%) and Dimethylstearyl-4-vinylbenzylammonium Chloride Step A - Dimethylstearyl-4-vinylbenzylammonium Chloride A quaternary nitrogen surface active agent, dimethylstearyl-4-vinylbenzylammonium chloride, is made by slowly adding 4-vinylbenzyl chloride (488 g.; 3.2 mol.) to a reaction flask containing water (2400 g.), the methylether of hydroquinone (4.4 g.), potassium iodide (0.8 g.) and dimethylstearyl amine (960 g.; 3.2 mol.). The temperature is maintained at 45°–50° C. during the 30 minute addition period. The solution, hazy at first, becomes clear and viscous. After about 1.5 hours, titration of the reaction mixture indicates that 98% of the amine has reacted. The 37% solids solution is used as a comonomer and the sole surfactant in the following experiment.

Step B - Polymerization of Dimethylstearyl-4-vinylbenzylammonium Chloride with Butyl Acrylate and Styrene To a suitable reaction flask equipped with a thermometer, nitrogen sweep, stirrer, condenser and addition funnels, is charged water (1800 g.) and 100 g. of a mixture of butyl acrylate (840 g.), styrene (562 g.) and 48 g. of the surfactant solution of Step A. The polymerization is started at 58° C. by adding to the flask an initiating system composed of tert-butylhydroperoxide (0.6 g.), ferrous ammonium sulfate (10 ml. of 0.1% solution) and sodium formaldehyde sulfoxylate (Formopon 0.6 g.). When polymerization has begun, as signified by an exotherm of about 5° C., the remaining monomer mixture, now containing tert-butylhydroperoxide (4 ml.) and an additional 48 g. of surfactant solution is gradually added over a period of three hours. Simultaneously, a solution of Formopon (3.0 g.) in water (100 ml.) is added. A stable latex is formed, 39.5% solids with a particle size of about 0.12 micrometers. The composition is 60% butyl acrylate, 37.5% styrene and 2.5% dimethylstearyl-4-vinylbenzylammonium chloride.

EXAMPLE 2

Latex of Ethyl Acrylate (60%), Styrene (37%) and Dimethylstearyl-4-vinylbenzylammonium Chloride (3%)

In a similar manner as that described in Example 1, a stable latex polymer, 39.5% solids, is prepared by replacing the butyl acrylate of Example 1 with ethyl acrylate and following the procedure described therein. The gum-free preparation, composition 60% ethyl acrylate, 37% styrene and 3% dimethylstearyl-4-vinylbenzylammonium chloride has a particle size of 0.10 micrometers.

EXAMPLE 3

Latex of Vinylacetate (97.5%) and Dimethylstearyl-4-vinylbenzylammonium Chloride A stable cationic latex is prepared by adding, over a period of 3.5 hours, a solution of vinyl acetate (681 g.) and tert-butylhydroperoxide (2.0 ml.) to a suitable reaction flask containing water (649 g.), stearyldimethyl-4-vinylbenzylammonium chloride solution (153.0 g.) and the initiating system composed of tert-butylhydroperoxide (10.6 g.), ferrous ammonium sulfate (10 ml., 0.1%) and sodium formaldehyde sulfoxylate (0.6 g.). During the addition period, a solution containing an additional amount of sodium formaldehyde sulfoxylate (1.5 g.) and stearyldimethyl-4-vinylbenzylammonium chloride (46.5 g.) is also slowly added. At the end of the reaction period, the solids content is 39.9%. The composition of the final product is 97.5% vinyl acetate and 2.5% dimethylstearyl-4-vinylbenzylammonium chloride.

its backbone. The following equation taken together with Table I illustrates the starting monomer materials.

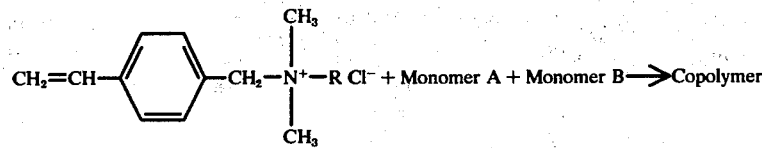

EXAMPLE 4

Latex of Vinylacetate (60%), Ethylacrylate (37.5%) and Dimethylstearyl-4-vinylbenzylammonium Chloride (2.5%)

To a flask containing water (649 g.) and 50 g. of a mixture of ethyl acrylate (261 g.), vinyl acetate (420 g.) and dimethylstearyl-4-vinylbenzylammonium chloride solution (153 g.) is added an initiating system identical to that used in Example 1. After the exotherm has subsided, the remaining mixture of monomers is gradually added over a period of three hours while maintaining the reaction temperature at 60°-65° C. Solids content of the bluish white latex is 37.8%. The composition is 60% vinyl acetate, 37.5% ethyl acrylate and 2.5% dimethylstearyl-4-vinylbenzylammonium chloride.

EXAMPLE 5

Latex of Butyl acrylate (40%), Methyl methacrylate (57.5%) and Dimethylstearyl-4-vinylbenzylammonium Chloride To a flask containing water (900 g.) and 50 g. of a mixture of butyl acrylate (280 g.), methyl methacrylate (406 g.) and dimethylstearyl-4-vinylbenzylammonium chloride solution (24 g.) is added an initiating system identical to that used in Example 1. After the exotherm has subsided, the remaining mixture of monomers is gradually added over a period of three hours while maintaining the reaction temperature at 60°-65° C. Solids content of the bluish white latex is 40%. The composition is 40% butyl acrylate, 57.5% methyl methacrylate and 2.5% dimethylstearyl-4-vinylbenzylammonium chloride.

EXAMPLE 6

Dimethyllauryl-4-vinylbenzylammonium Chloride and Dimethylmyristyl-4-vinylbenzylammonium Chloride A quaternary surface active agent is made as described in Step A, Example 1, except that the reagents are of a mixture of n-$C_{12}$- and n-$C_{14}$ dimethylamines (388 g; 1.61 mol.), 4-vinylbenzyl chloride (1.61 mol.), methylether hydroquinone (2.4 g.), potassium iodide (0.4 g.) and water (1200 g.) Conversion to the mixture of dimethyllauryl-4-vinylbenzylammonium chloride and dimethylmyristyl-4-vinylbenzylammonium chloride is greater than 95.5% as determined by titration. The solids content is 34.6%.

In a manner similar to that described in Example 1 all the polymers described in this invention may be prepared. Thus by substituting for the dimethylstearyl amine of Step A, Example 1, another suitable alkyldimethyl amine and by following substantially the procedure described therein, there is obtained a vinylbenzylalkyldimethylammonium halide which may be reacted with one or more monomers to afford the desired latex products having the surface active agent as part of

TABLE I

| Ex. No. | R | Monomer A | Monomer B |
|---|---|---|---|
| 7 | n-$C_9H_{19}$— | $CH_2=CHCl$ | $CH_2=CHOCCH_3$ (O) |
| 8 | n-$C_{10}H_{21}$— | $CH_2=CCl_2$ | $CH_2=CHC-OC_2H_5$ (O) |
| 9 | n-$C_{11}H_{23}$— | $CH_2=CHCN$ | phenyl-$CH=CH_2$ |
| 10 | n-$C_{13}H_{27}$— | $CH_2=CHCHO$ | $CH_2=C(CH_3)-C-OCH_3$ (O) |
| 11 | n-$C_{15}H_{31}$— | $CH_2=CHC-OC_2H_5$ (O) | phenyl-$CH=CH_2$ |
| 12 | n-$C_{16}H_{33}$— | $CH_2=CHC-OC_3H_7$ (O) | $CH_2=CHOCCH_3$ (O) |
| 13 | n-$C_{17}H_{35}$— | $CH_2=CHC-OC_4H_9$ (O) | $CH_2=C(CH_3)-C-OCH_3$ (O) |
| 14 | n-$C_{18}H_{37}$— | $CH_2=CHC-OC_2H_5$ (O) | phenyl-$CH=CH_2$ |
| 15 | n-$C_{19}H_{39}$— | $CH_2=CHCOC_8H_{17}$ (O) | $CH_2=CHC-OC_4H_9$ (O) |
| 16 | n-$C_{22}H_{45}$— | $CH_2=CHCOC_8H_{17}$ (O) | $CH_2=C(CH_3)-C-OC_{12}H_{25}$ (O) |

EXAMPLE 17

Sizing

Polymer emulsions are incorporated into paper by deposition onto 500 CSF Chesapeake unbleached Kraft pulp at pH 4.5. Basis weight is maintained at about 150 lb./ream. After formation, the papers are dried at 200° F. on the drum drier for one 7½ minute cycle. The emulsions are incorporated at 0.5% on pulp first adding 0.1%, on pulp, of a cationic sizing aid (solids on solids in both instances).

EXAMPLE 18

Beater Deposition

The polymers of this invention are deposited in a Valley beater at a level of 30% on an unbeaten alpha hardwood sulfite furnish. Depositions are made at 1% consistency and then diluted to 0.25% consistency.

EXAMPLE 19

Water Repellency

A formulation bath is made by diluting 5 parts of the emulsion in Example 1 with water and adding 0.5 parts of a fluorocarbon (FC 824 - a 3M fluorocarbon). The final bath solid is 3.5%.

What is claimed is:

1. An aqueous polymer latex which comprises 0.25 to 5.0% of the total polymer composition of a vinylbenzyltrialkylammonium salt monomer having the formula

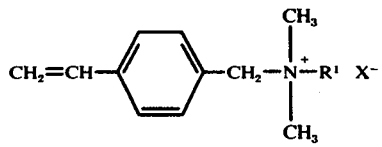

wherein $R^1$ is alkyl of from 8 to 22 carbon atoms and $X^-$ is an anion, copolymerized with one or more of monomers selected from the following:

a. a monomer of the formula

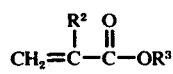

wherein $R^2$ is hydrogen or alkyl and $R^3$ is a straight chain, branched chain or cyclic alkyl, alkoxyalkyl, alkylthioalkyl, ureido, hydroxy lower alkyl, 2,3-epoxypropyl, amino lower alkyl, mono- or di- lower alkylamino, lower alkyl or hydroxyalkyl lower alkylamino lower alkyl or b. a monomer of the formula

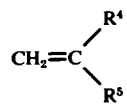

wherein $R^4$ is hydrogen, methyl or halo and $R^5$ is hydrogen, halo, lower alkanoyloxy, formyl, phenyl, N-hydroxyethyl, tolyl, methoxyethyl, 2,4-diamino-s-triazinyl, lower alkyl, or epoxy, said vinylbenzyltrialkylammonium salt being the sole surfactant in the latex.

2. A latex polymer according to claim 1 wherein R is alkyl of from 12 to 18 carbon atoms and $X^-$ is chloride.

3. A latex polymer according to claim 2 wherein the monomer is dimethylstearyl-4-vinylbenzylammonium chloride.

4. A latex polymer according to claim 2 wherein the monomer is dimethyllauryl-4-vinylbenzylammonium chloride.

5. A latex polymer according to claim 2 wherein the monomer is dimethylmyristyl-4-vinylbenzylammonium chloride.

6. An article of manufacture having a cured coating of the latex polymer of claim 1.

* * * * *

UNITED STATES PATENT AND TRADEMARK OFFICE
CERTIFICATE OF CORRECTION

PATENT NO. : 4,017,440
DATED : April 12, 1977
INVENTOR(S) : H. Scott Killam

It is certified that error appears in the above-identified patent and that said Letters Patent are hereby corrected as shown below:

Column 1, lines 11 to 14 should read:

"tions as a latex stabilizing surfactant which has been incorporated directly into the polymer backbone, as the sole latex stabilizing surfactant."

Signed and Sealed this

Fourth Day of April 1978

[SEAL]

Attest:

RUTH C. MASON
Attesting Officer

LUTRELLE F. PARKER
Acting Commissioner of Patents and Trademarks